(12) United States Patent
Burnett

(10) Patent No.: US 6,804,599 B1
(45) Date of Patent: Oct. 12, 2004

(54) ELECTRICAL SYSTEM FOR DETECTING AND CORRECTING LOSS OF VEHICLE CONTROL CAUSED BY WHEEL SLIPPING

(76) Inventor: Terry Lee Burnett, 7968 Grandstaff Dr., Sacramento, CA (US) 95823

( * ) Notice: Subject to any disclaimer, the term of this patent is extended or adjusted under 35 U.S.C. 154(b) by 0 days.

(21) Appl. No.: 10/120,216

(22) Filed: Apr. 11, 2002

(51) Int. Cl.[7] ................................................. G05D 1/00
(52) U.S. Cl. ........................... 701/76; 701/74; 307/10.8
(58) Field of Search .............................. 701/76, 70, 71, 701/74, 75; 340/431; 307/10.8, 10.1, 9.1; 180/54.1

(56) References Cited

U.S. PATENT DOCUMENTS

| | | | |
|---|---|---|---|
| 3,680,655 A | | 8/1972 | Beyerlein ................... 180/54.1 |
| 3,743,361 A | * | 7/1973 | Vieth, Jr. ..................... 303/112 |
| 4,077,675 A | | 3/1978 | Leiber et al. ................ 285/184 |
| 4,374,421 A | | 2/1983 | Leiber .......................... 701/73 |
| 4,489,382 A | | 12/1984 | Jonner et al. .................. 701/73 |
| 5,588,935 A | * | 12/1996 | Osinski et al. ............... 477/107 |
| 5,854,517 A | | 12/1998 | Hines ........................ 307/10.8 |
| 5,857,160 A | * | 1/1999 | Dickinson et al. ............. 701/41 |
| 5,920,128 A | | 7/1999 | Hines ......................... 307/10.8 |
| 5,945,743 A | | 8/1999 | Pattantyus et al. .......... 307/10.1 |
| 6,434,470 B1 | * | 8/2002 | Nantz et al. ................... 701/93 |

FOREIGN PATENT DOCUMENTS

| EP | WO 86/04031 | * | 7/1986 | ........... B62D/59/02 |

* cited by examiner

Primary Examiner—Marthe Y. Marc-Coleman
(74) Attorney, Agent, or Firm—Richard L. Mikesell

(57) ABSTRACT

An electrical system for detecting and correcting loss of control, including wheel slipping or skidding, of a vehicle pulling a fifth wheel trailer includes a first wheel movement sensor disposed adjacent a driven wheel of the vehicle, and a second wheel movement sensor operably disposed adjacent to a non-driven wheel of the vehicle. A computer receives electrical signals from the sensors which indicate a function of either drive wheel rotational speed, or non-driven wheel rotational speed, respectively. The computer compares the signals produced by the wheel sensors and activates a disengaging mechanism which disengages a drive line of the vehicle by disengaging the drive line from a vehicle clutch when the driven wheel rotational speed exceeds the non-driven wheel rotational speed by a predetermined amount.

11 Claims, 1 Drawing Sheet

ELECTRICAL SYSTEM FOR DETECTING AND CORRECTING LOSS OF VEHICLE CONTROL CAUSED BY WHEEL SLIPPING

BACKGROUND OF THE INVENTION

The present invention generally relates to an electrical system for detecting and correcting loss of control of a vehicle pulling a fifth wheel trailer, including wheel slipping or skidding, or trailer pitch or yaw.

Driving a motor vehicle properly and safely requires that a motorist be trained and licensed. The training of motorists can involve behind-the-wheel experiences as well as classroom time. Training for drivers of automobiles is decidedly different than that for drivers of tractor-trailers, buses and recreational vehicles. This latter group must be concerned about the proper way to maneuver these larger vehicle and any trailers that they might be towing especially during inclimate weather conditions. It is during those conditions that the majority of highway accidents occur. Many of these accidents could be prevented if driver training was completed and motor vehicles were fitted with safety equipment.

It is a common experience with automotive vehicles for excessive wheel slip or spinning to occur during vehicle acceleration. This happens when the operator causes an extremely high engine torque to be delivered to the driven wheels such that the frictional forces between the tire and the road are overcome. In the event that the road surface is slippery a moderate engine torque can cause such slipping. While a small amount of slip between the tire and road surface is necessary to achieve a driving force, an excessive slip results in reduction of effective driving force or traction.

During vehicle acceleration slipping between the driven wheels and the road surface is always present, otherwise no tractive force would be developed. The amount of slipping increases as driving torque applied to the wheels increases until the wheel traction reaches maximum and thereafter traction decreases with further increases of wheel slip. The point of maximum traction varies according to road conditions.

Ice is a particularly dangerous hazard on any type of road or highway. Those who drive large trucks with trailers attached to them, often referred to as fifth wheel trailers, are especially prone to accidents during icy conditions. Drivers should proceed in a careful manner. They should maintain a steady, low speed and use caution when applying brakes or taking curves. If any of these precautions are neglected, they can result in a jackknife experience that can cause property damage, injury, or even death.

Accordingly, there is a continuing need for a system for detecting and correcting such loss of vehicle control. The present invention fulfills this need and provides other related advantages.

SUMMARY OF THE INVENTION

The present invention resides in an electrical system for detecting and correcting loss of control, including wheel slipping or skidding, or a vehicle pulling a fifth wheel trailer. The system comprises a first wheel movement sensor operably disposed adjacent to a driven wheel of the vehicle, and producing an electrical signal as a function of drive wheel rotational speed. A second wheel movement sensor is similarly disposed adjacent to a non-driven wheel of the vehicle and produces an electrical signal as a function of non-driven wheel rotational speed. A computer is an electrical connection with the wheel sensors for receiving and comparing the signals produced by the wheel sensors. A disengaging mechanism controlled by the computer for disengaging a drive line of the vehicle, typically from a vehicle clutch, when the driven wheel rotational speed exceeds the non-driven wheel rotational speed by a predetermined amount. In a particularly preferred embodiment, the disengaging mechanism is controlled by means of a cruise control system of the vehicle, which is operably connected to the computer.

In a particularly preferred form of the invention, a trailer pivot sensor produces an electrical signal as a function of trailer pitch and yaw. A steering wheel position sensor may also be incorporated to track the position of the steering wheel in comparison to the trailer position. A temperature sensor may be associated with the vehicle for monitoring ambient temperature. These components are electrically connected to the computer, and information may be provided to a monitor connected to the computer and disposed within a cab portion of the vehicle. Preferably, the monitor includes a tachometer.

Thus, when the electrical system of the present invention detects loss of control due to wheel slipping or skidding, or trailer misalignment due to improper wheel speed, the drive line of the vehicle is at disengaged, such as by disengaging the clutch of the vehicle, allowing the driven and non-driven wheels to match one anothers road speed and correct any wheel slipping or skidding that may cause trailer jackknifing or the like.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
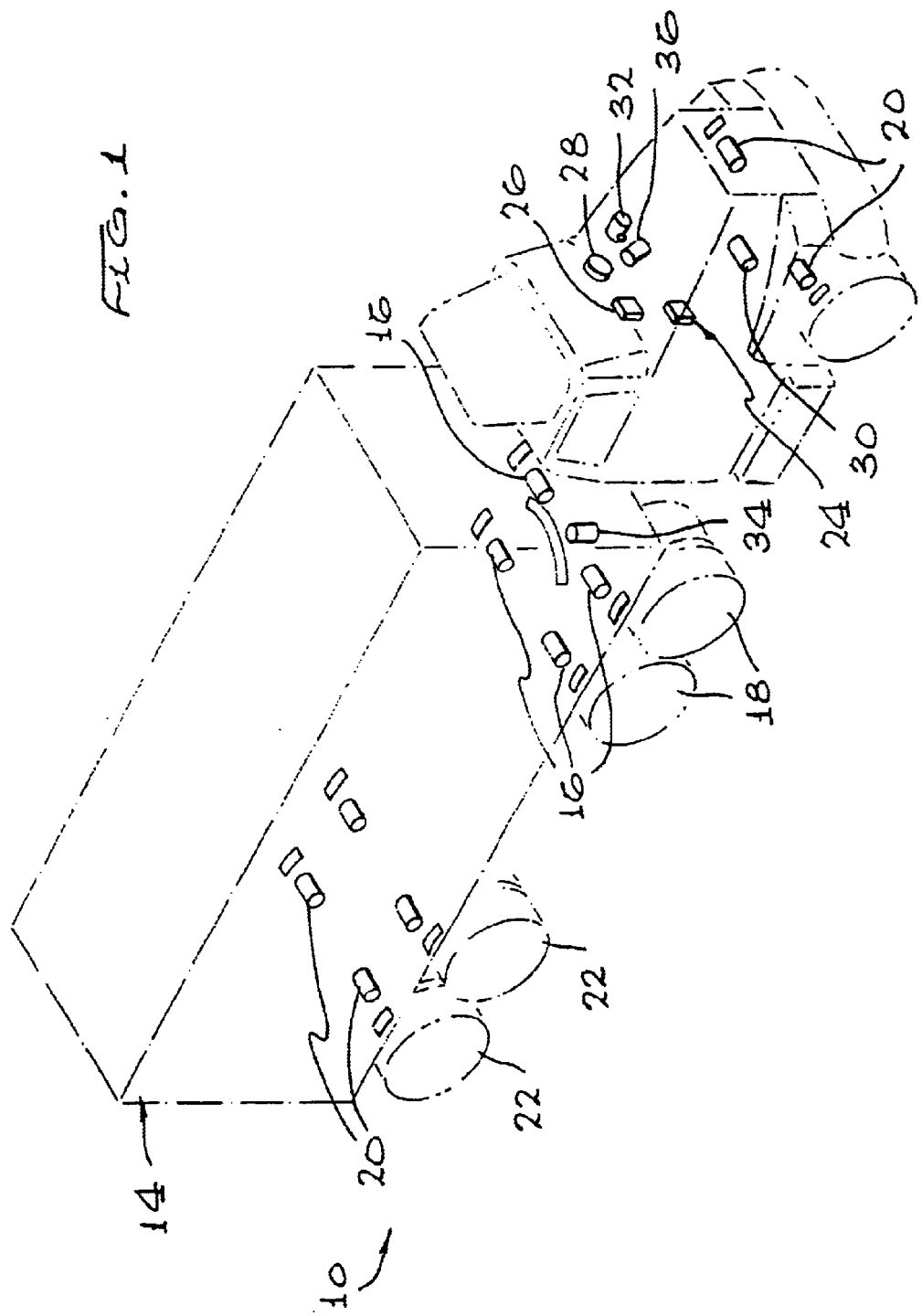
FIG. 1 is a perspective view of a tractor vehicle pulling a fifth wheel trailer, illustrated in phantom, and various components comprising an electrical system for detecting and correctly loss of control of the vehicle embodying the present invention.

As shown in FIG. 1, for purposes of illustration, the invention resides in a system 10 for detecting and correcting loss of control of a vehicle 12 pulling a fifth wheel trailer 14. The purpose of the system 10 of the present invention is to limit the engine torque applied to the driven wheels of the vehicle 12 when the wheel slip exceeds a predetermined value, such as 10%.

The system 10 includes a wheel movement sensor 16, such as a transducer, operably disposed adjacent to wheels 18 engaged with a drive line of the vehicle 12 and thus driven or directly controlled by the engine of the vehicle 12. In the illustrated figure, such driven wheels are in the rear of the vehicle, the vehicle being a rear wheel drive vehicle. However, if the vehicle 12 is a front wheel drive vehicle, such sensors 16 would be placed adjacent to the front wheels.

Similarly, wheel movement sensors 20, such as transducers, are operably disposed adjacent to non-driven wheels 22 of the vehicle 12, and particularly those on the trailer 14. The wheel sensors 16 and 20 generate signals proportional to the respective wheel speeds.

These signals are fed into a computer 24 electrically connected to the sensors 16 and 20 which serves as a comparator and compares the non-driven and driven wheel rotational speeds. A monitor 26, including a tachometer 28, may be placed in a cab portion of the vehicle 12 so that the driver can visually monitor the rotational wheel speed, and other aspects detected by the system 10. The tachometer 28 may comprise a non-driven wheel tachometer, and a driven wheel tachometer so that a visual comparison can be readily made.

A temperature sensor 30 may be incorporated into the system 10 for detecting the ambient temperature outside of the vehicle 12. Such temperature readings could assist the system 10 in determining if the outside temperature is cool enough to support icy conditions. Such temperature reading could be displayed on the cab monitor 26.

When the computer 24 detects that the wheel rotational speed of the driven wheel 18 exceeds the rotational speed of the non-driven wheel 22 by predetermined amount, a disengaging mechanism is activated for disengaging a drive line of the vehicle 12, thus reducing the torque applied to the driven wheels 18 so that the driven wheel speed may approximate the non-driven wheel speed. Typically, this is performed by disengaging a clutch of the vehicle 12, such as by means of hydraulics. Such means may also comprise a cruise control system 32 of the vehicle 12 which is inherently designed to shift gears, and increase or decrease speed of the vehicle 12.

The system 10 also preferably includes a trailer pivot sensor 34 that produces an electrical signal as a function of trailer pitch and yaw. A steering wheel position sensor 36 may be disposed adjacent to the vehicle steering wheel for comparing the placement of the steering wheel to the position of the trailer pivot sensor 34 reading. The computer 24 can utilize such readings to disengage the vehicle drive line as discussed above, or alert the driver through the monitor 26 of the loss of control.

The present invention is designed to allow a motorist to control with greater proficiency the inconsistent and unexpected movements attributed to traveling over icy road conditions, or other slippery conditions. The combination of the interaction of the above-described components of the system 10 serves to provide the control needed to bring a vehicle 12 back into a consistent wheel pattern from an inconsistent one. This allows a driver to avoid a jackknife situation by helping the driver to keep wheel speed constant and under control. This is accomplished by disengaging the driven wheels to freely rotate, allowing them to match the road speed of the other non-driven wheels which will allow traction to be regained.

Although several embodiments have been described in detail for purposes of illustration, various modifications may be made without departing from the scope and spirit of the invention. Accordingly, the invention is not to be limited, except as by the appended claims.

What is claimed is:

1. An electrical system for detecting and correcting loss of control, including wheel slipping or skidding, of a vehicle pulling a fifth wheel trailer, the system comprising:
    a first wheel movement sensor operably disposed adjacent to a driven wheel of the vehicle and producing an electrical signal as a function of drive wheel rotational speed;
    a second wheel movement sensor operably disposed adjacent to a non-driven wheel of the vehicle and producing an electrical signal as a function of non-driven wheel rotational speed;
    a computer in electrical connection with the wheel sensors for receiving and comparing the signals produced by the wheel sensors; and
    a disengaging mechanism controlled by the computer for disengaging a driveline of the vehicle when the driven wheel rotational speed exceeds the non-driven wheel rotational speed by a predetermined amount.

2. The system of claim 1, wherein the disengaging mechanism disengages the driveline from a vehicle clutch.

3. The system of claim 1, including a temperature sensor associated with the vehicle and electrically connected to the computer for monitoring ambient temperature.

4. The system of claim 1, including a monitor connected to the computer and disposed within a cab portion of the vehicle.

5. The system of claim 4, wherein the monitor includes a tachometer.

6. The system of claim 1, wherein the disengaging mechanism is controlled by means of a cruise control system of the vehicle operably connected to the computer.

7. The system of claim 1, including a trailer pivot sensor producing an electrical signal as a function of trailer pitch and yaw, operably connected to the computer.

8. The system of claim 7, including a steering wheel position sensor operably connected to the computer.

9. An electrical system for detecting and correcting loss of control, including wheel slipping or skidding, of a vehicle pulling a fifth wheel trailer, the system comprising:
    a first wheel movement sensor operably disposed adjacent to a driven wheel of the vehicle and producing an electrical signal as a function of drive wheel rotational speed;
    a second wheel movement sensor operably disposed adjacent to a non-driven wheel of the vehicle and producing an electrical signal as a function of non-driven wheel rotational speed;
    a computer in electrical connection with the wheel sensors for receiving and comparing the signals produced by the wheel sensors;
    a trailer pivot sensor producing an electrical signal as a function of trailer pitch and yaw, operably connected to the computer;
    a temperature sensor associated with the vehicle and electrically connected to the computer for monitoring ambient temperature;
    a monitor connected to the computer and disposed within a cab portion of the vehicle; and
    a disengaging mechanism controlled by the computer for disengaging a driveline of the vehicle from a vehicle clutch when the driven wheel rotational speed exceeds the non-driven wheel rotational speed by a predetermined amount, the disengaging mechanism being controlled by means of a cruise control system of the vehicle operably connected to the computer.

10. The system of claim 9, wherein the monitor includes a tachometer.

11. The system of claim 9, including a steering wheel position sensor operably connected to the computer.

* * * * *